United States Patent
Hsu et al.

(10) Patent No.: US 11,055,255 B2
(45) Date of Patent: Jul. 6, 2021

(54) INTERFACE CONNECTION APPARATUS AND METHOD

(71) Applicant: Realtek Semiconductor Corporation, Hsinchu (TW)

(72) Inventors: Fu-Ching Hsu, Hsinchu (TW); Chih-Wei Chang, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/741,932

(22) Filed: Jan. 14, 2020

(65) Prior Publication Data

US 2020/0341936 A1   Oct. 29, 2020

(30) Foreign Application Priority Data

Apr. 25, 2019   (TW) .................................. 108114565
Dec. 12, 2019   (TW) .................................. 108145582

(51) Int. Cl.
*G06F 13/40* (2006.01)
*G06F 13/38* (2006.01)
*G06F 13/42* (2006.01)

(52) U.S. Cl.
CPC ........ *G06F 13/4286* (2013.01); *G06F 13/385* (2013.01); *G06F 13/4072* (2013.01)

(58) Field of Classification Search
CPC . G06F 13/4072; G06F 13/385; G06F 13/4286
USPC ............. 710/15–16, 106; 370/484, 525–526; 341/1, 126, 152
See application file for complete search history.

(56) References Cited

U.S. PATENT DOCUMENTS

| | | | | | |
|---|---|---|---|---|---|
| 4,631,484 A | * | 12/1986 | Malka | ....................... | G06F 1/12 327/160 |
| 5,523,726 A | * | 6/1996 | Kroeger | .............. | H04L 27/2092 332/103 |
| 5,564,114 A | * | 10/1996 | Popat | ................... | G06F 13/4226 710/100 |
| 5,696,599 A | * | 12/1997 | Tiso | ................... | H04N 1/00127 358/434 |

(Continued)

*Primary Examiner* — Idriss N Alrobaye
*Assistant Examiner* — Henry W Yu
(74) *Attorney, Agent, or Firm* — Locke Lord LLP; Tim Tingkang Xia, Esq.

(57) ABSTRACT

An interface connection apparatus disposed in a first electronic device is provided that includes an analog physical layer circuit, a waveform generation circuit and a media access control circuit. The analog physical layer circuit receives an analog handshake signal from a second electronic device and generates a digital handshake signal. The waveform generation circuit determines whether a matching times that a pulse parameter of each of pulses included in the digital handshake signal is within a predetermined pulse parameter range reaches predetermine times and generates a digital output signal when the matching times reaches the predetermine times, and an output pulse parameter of all output pulses of the digital output signal is within the predetermined pulse parameter range. The media access control circuit determines that the analog handshake signal is valid when the media access control circuit receives the digital output signal to keep performing handshake.

12 Claims, 3 Drawing Sheets

(56) References Cited

U.S. PATENT DOCUMENTS

| | | | | |
|---|---|---|---|---|
| 5,734,844 A | * | 3/1998 | Moughanni | G06F 13/24 |
| | | | | 710/107 |
| 6,278,255 B1 | * | 8/2001 | Yoo | H02P 23/16 |
| | | | | 318/599 |
| 6,377,782 B1 | * | 4/2002 | Bishop | H04L 12/2801 |
| | | | | 370/277 |
| 2005/0179576 A1 | * | 8/2005 | Tarui | G01R 31/31924 |
| | | | | 341/155 |
| 2005/0219107 A1 | * | 10/2005 | Guidry | H03M 1/1285 |
| | | | | 341/163 |
| 2013/0197920 A1 | * | 8/2013 | Lesso | H04L 25/4902 |
| | | | | 704/500 |

\* cited by examiner

INTERFACE CONNECTION APPARATUS AND METHOD

RELATED APPLICATIONS

This application claims priority to Taiwan Application Serial Number 108114565, filed Apr. 25, 2019, and Taiwan Application Serial Number 108145582, filed Dec. 12, 2019, the disclosures of which are incorporated herein by reference in their entireties.

BACKGROUND

Field of Invention

The present invention relates to an interface connection technology. More particularly, the present invention relates to an interface connection apparatus and an interface connection method.

Description of Related Art

More and more different kinds of hard disks are presented in the market to cause the issue of compatibility. When the hard disk and the host are connected to each other by using the interface of serial advanced technology attachment (SATA), the signals transmitted therebetween during the handshake process are easily affected by the manufacturing process and the environment such that the signals might not be correctly identified. The signals not identified correctly result in failure of connection. Once the connection is failed, a reset process or a restart of the handshake can be performed. However, even if the connection is established successfully after the restart of the handshake, the transmission speed may be set to be lower due to the design of some of the hard disks.

Accordingly, what is needed is an interface connection apparatus and an interface connection method to address the issues mentioned above.

SUMMARY

An aspect of the present invention is to provide an interface connection apparatus disposed in a first electronic device that includes an analog physical layer circuit, a waveform generation circuit and a media access control circuit. The analog physical layer circuit is configured to receive an analog handshake signal from a second electronic device and generates a digital handshake signal. The waveform generation circuit is configured to determine whether a number of matching times that a pulse parameter of each of pulses included in the digital handshake signal is within a predetermined pulse parameter range reaches a number of predetermine times, and generate a digital output signal when the number of the matching times reaches the number of the predetermine times, in which an output pulse parameter of each of output pulses of the digital output signal is within the predetermined pulse parameter range. The media access control circuit is configured to determine that the analog handshake signal is valid when the media access control circuit receives the digital output signal to keep performing handshake.

Another aspect of the present invention is to provide an interface connection method used in an interface connection apparatus disposed in a first electronic device that includes the steps outlined below. An analog handshake signal is received from a second electronic device and a digital handshake signal is generated by an analog physical layer circuit. Whether a number of matching times that a pulse parameter of each of pulses included in the digital handshake signal is within a predetermined pulse parameter range reaches a number of predetermine times is determined by a waveform generation circuit. A digital output signal is generated by the waveform generation circuit when the number of the matching times reaches the number of the predetermine times, in which an output pulse parameter of each of output pulses of the digital output signal is within the predetermined pulse parameter range. The analog handshake signal is determined to be valid by a media access control circuit when the media access control circuit receives the digital output signal to keep performing handshake.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
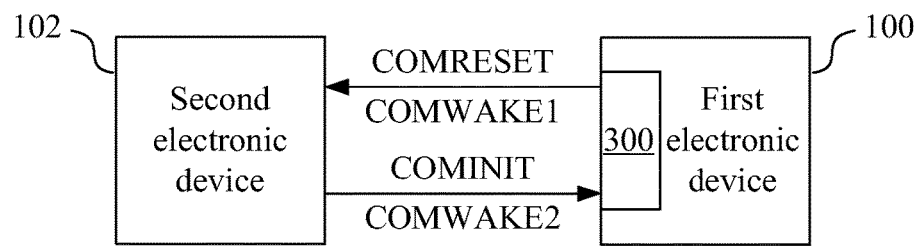
FIG. 1 is a block diagram of a first electronic device and a second electronic device in an embodiment of the present invention.

Reference is made to FIG. 1. FIG. 1 is a block diagram of a first electronic device 100 and a second electronic device 102 in an embodiment of the present invention.

In an embodiment, the first electronic device 100 is a host. In an embodiment, the second electronic device 102 can be any device capable of being electrically coupled to the first electronic device 100, e.g. a hard disk. As a result, the first electronic device 100 is a master terminal and the second electronic device 102 is a slave terminal.

In an embodiment, the first electronic device 100 and the second electronic device 102 are electrically coupled to each other by using an interface of serial advanced technology attachment (SATA).

Figure 2:
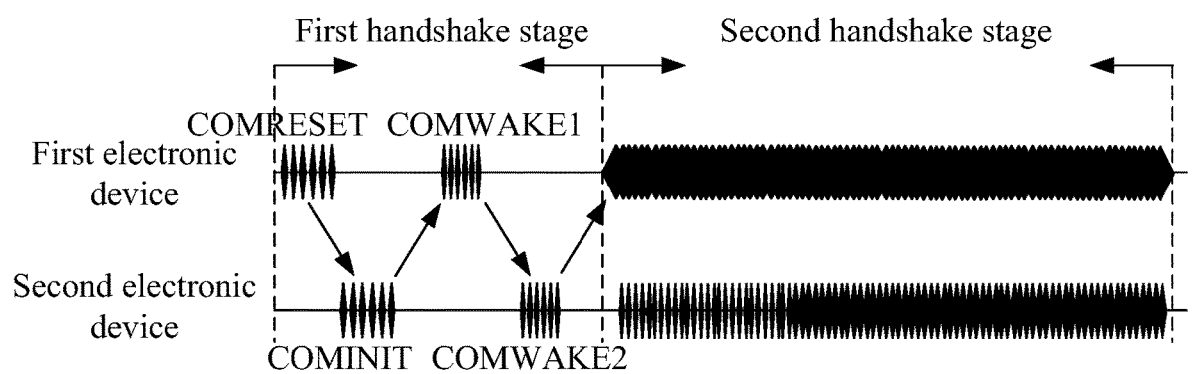
FIG. 2 is a timing diagram of the signals transmitted between the first electronic device and the second electronic device in an embodiment of the present invention.

Reference is now made to FIG. 2. FIG. 2 is a timing diagram of the signals transmitted between the first electronic device 100 and the second electronic device 102 in an embodiment of the present invention.

As illustrated in FIG. 2, when the first electronic device 100 and the second electronic device 102 start to be electrically coupled to each other, a first handshake stage is entered.

In the first handshake stage, the first electronic device 100 transmits a communication reset signal COMRESET to the second electronic device 102 first such that the second electronic device 102 generates a communication initialization signal COMINIT.

Further, after the first electronic device 100 acknowledges the reception of the communication initialization signal COMINIT, the first electronic device 100 transmits a first electronic device communication wakeup signal COMWAKE1 to the second electronic device 102 such that the second electronic device 102 generates the second electronic device communication wakeup signal COMWAKE2 to the first electronic device 100. Furthermore, after the first electronic device 100 acknowledges the reception of the second electronic device communication wakeup signal COMWAKE2, the first electronic device 100 determines that the first electronic device 100 and the second electronic device 102 are connected successfully to enter a second handshake stage.

In the second handshake stage, the first electronic device 100 and the second electronic device 102 perform transmission of other signals to negotiate a transmission speed.

The first electronic device includes an interface connection apparatus 300. In an embodiment, the interface connection apparatus 300 is electrically coupled to the second electronic device 102 to perform the handshake procedure described above.

Figure 3:
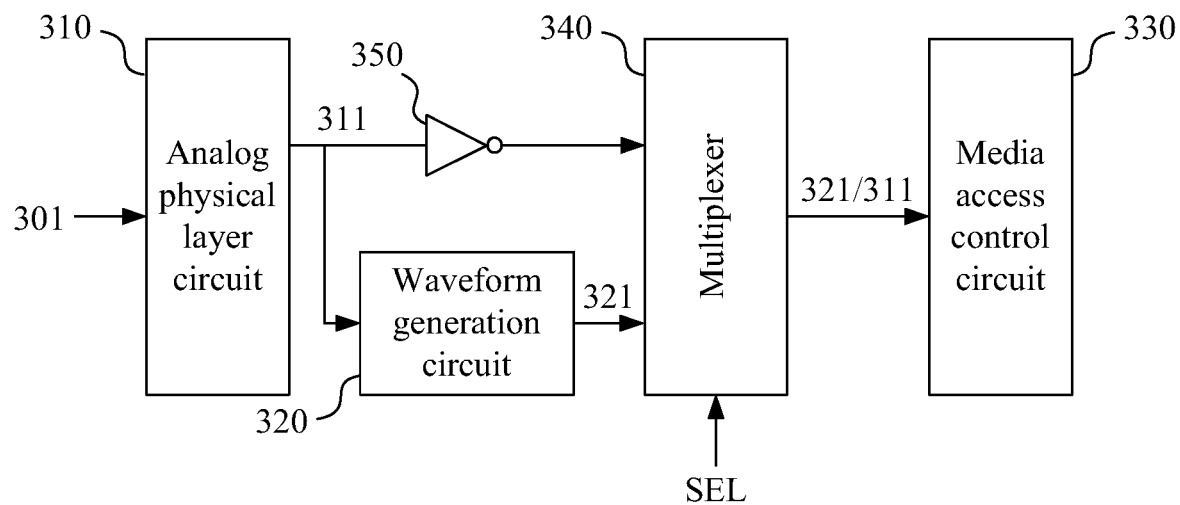
FIG. 3 is a more detailed block diagram of the interface connection apparatus in an embodiment of the present invention.

Reference is now made to FIG. 3. FIG. 3 is a more detailed block diagram of the interface connection apparatus 300 in an embodiment of the present invention.

The interface connection apparatus 300 includes an analog physical layer circuit 310, a waveform generation circuit 320, a media access control circuit 330 and a multiplexer 340.

The analog physical layer circuit 310 is configured to receive an analog handshake signal 301 from the second electronic device 102 and generates a digital handshake signal 311.

Figure 4:
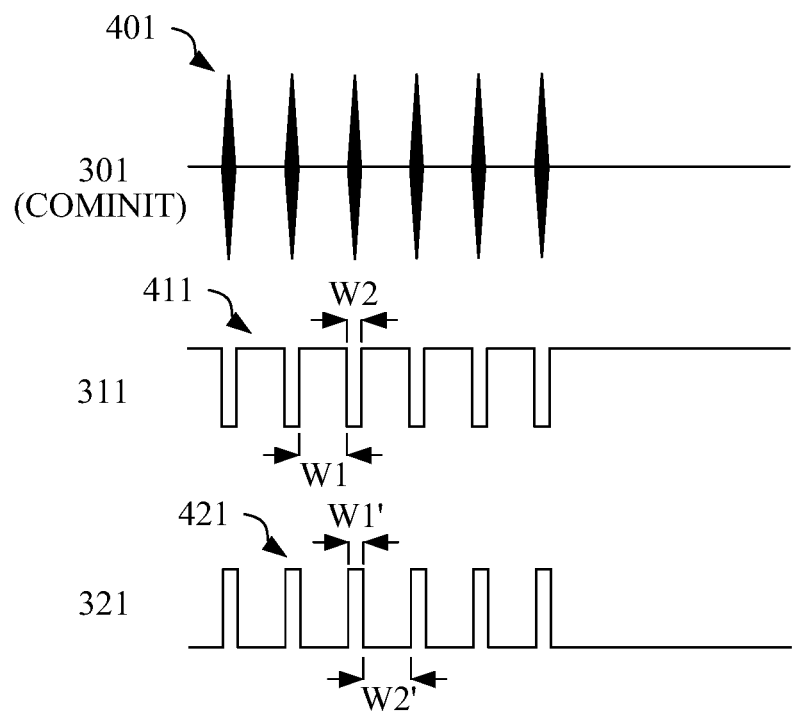
FIG. 4 is a diagram of waveforms of the signals transmitted in the interface connection apparatus in an embodiment of the present invention.

Reference is now made to FIG. 4. FIG. 4 is a diagram of waveforms of the signals transmitted in the interface connection apparatus 300 in an embodiment of the present invention.

In FIG. 4, the analog handshake signal 301 is illustrated by using the communication initialization signal COMINIT in FIG. 2 as an example and includes a plurality of pulses 401.

In an embodiment, the digital handshake signal 311 is an idle signal and also includes a plurality of pulses 411. In an embodiment, the digital handshake signal 311 is an inverse of the analog handshake signal 301. More specifically, the high states of the pulses 401 of the analog handshake signal 301 correspond to the low states of the pulses 411 of the digital handshake signal 311. The low states of the pulses 401 of the analog handshake signal 301 correspond to the high state of the pulses 411 of the digital handshake signal 311.

Each of the pulses 411 of the digital handshake signal 311 has a pulse parameter. In an embodiment, the pulse parameter includes such as, but not limited to high state pulse width W1 and/or a low state pulse width W2.

In an embodiment, the waveform generation circuit 320 is disposed in a digital physical layer circuit (not illustrated) and is configured to determine whether a number of matching times that the pulse parameter of each of the pulses 411 included in the digital handshake signal 311 is within a predetermined pulse parameter range reaches a number of predetermine times.

In a numerical example, take the communication initialization signal COMINIT as an example, the predetermined pulse parameter range corresponds to the high state pulse width W1 is above or below 320 nanoseconds for 5%. The predetermined pulse parameter range corresponds to the low state pulse width W2 is above or below 106 nanoseconds for 5%. It is appreciated that the values described above is merely an example. The present invention is not limited thereto.

In an embodiment, the number of predetermine times is 4 times. When the pulse parameters of four pulses 411 are within the predetermined pulse parameter range, the waveform generation circuit 320 determines that the number of the matching times reaches the number of the predetermined times and generates a digital output signal 321, in which an output pulse parameter of each of output pulses 421 of the digital output signal 321 is within the predetermined pulse parameter range. In an embodiment, the output pulse parameter includes such as, but not limited to a high state output pulse width W1' and/or a low state output pulse width W2'.

In an embodiment, the digital output signal 321 is the inverse of the digital handshake signal 311. As a result, the phase of the digital output signal 321 is the same as the phase of the analog handshake signal 301.

In an embodiment, the multiplexer 340 is disposed in the digital physical layer circuit together with the waveform generation circuit 320. The multiplexer 340 has a first terminal selectively electrically coupled to one of the waveform generation circuit 320 and the analog physical layer circuit 310, and a second terminal electrically coupled to the media access control circuit 330.

The multiplexer 340 is configured to be electrically coupled to the waveform generation circuit 320 in a default setting to transmit the digital output signal 321 to the media access control circuit 330 when the number of the matching times reaches the number of the predetermine times.

The media access control circuit 330 is configured to determine that the analog handshake signal 301 is valid when the media access control circuit 330 receives the digital output signal 321 to keep performing handshake. In an embodiment, after verifying the validity of the analog handshake signal 301, the first electronic device 100 transmits the first electronic device communication wakeup signal COMWAKE1 to the second electronic device 102 and receives the second electronic device communication wakeup signal COMWAKE2 from the second electronic device 102 to verify the validity thereof.

In an embodiment, when the waveform generation circuit 320 determines that the number of the matching times does not reach the number of the predetermined times, the media access control circuit 330 determines that the analog handshake signal 301 is invalid. In an embodiment, when the analog handshake signal 301 is determined to be invalid, the first electronic device 100 and the second electronic device 102 performs handshake process again until the handshake is valid or until the connection is determined to be failed.

Figure 5:
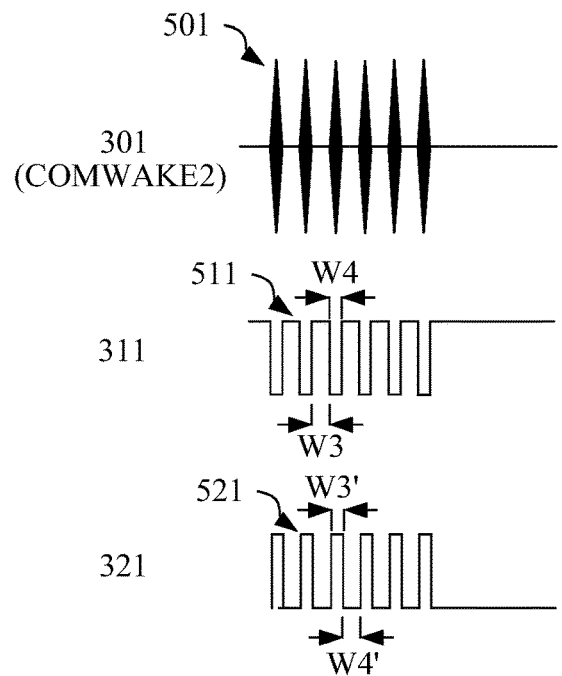
FIG. 5 is a diagram of waveforms of the signals transmitted in the interface connection apparatus in an embodiment of the present invention.

Reference is now made to FIG. 5. FIG. 5 is a diagram of waveforms of the signals transmitted in the interface connection apparatus 300 in an embodiment of the present invention.

In FIG. 5, the analog handshake signal 301 is illustrated by using the second electronic device communication wakeup signal COMWAKE2 in FIG. 2 as an example and includes a plurality of pulses 501.

In an embodiment, the digital handshake signal 311 is an idle signal and also includes a plurality of pulses 511. In an embodiment, the digital handshake signal 311 is an inverse of the analog handshake signal 301. More specifically, the high states of the pulses 501 of the analog handshake signal 301 correspond to the low states of the pulses 511 of the digital handshake signal 311. The low states of the pulses 501 of the analog handshake signal 301 correspond to the high state of the pulses 511 of the digital handshake signal 311.

Each of the pulses 511 of the digital handshake signal 311 has a pulse parameter. In an embodiment, the pulse parameter includes such as, but not limited to high state pulse width W3 and/or a low state pulse width W4.

The waveform generation circuit 320 is configured to determine whether a number of matching times that the pulse parameter of each of the pulses 511 included in the digital handshake signal 311 is within a predetermined pulse parameter range reaches a number of predetermine times.

In a numerical example, take the second electronic device communication wakeup signal COMWAKE2 as an example, the predetermined pulse parameter range corresponds to the high state pulse width W3 is above or below 106 nanoseconds for 5%. The predetermined pulse parameter range corresponds to the low state pulse width W4 is above or below 106 nanoseconds for 5%. It is appreciated that the values described above is merely an example. The present invention is not limited thereto.

In an embodiment, the number of predetermine times is 4 times. When the pulse parameters of four pulses 511 are within the predetermined pulse parameter range, the waveform generation circuit 320 determines that the number of the matching times reaches the number of the predetermined times and generates a digital output signal 321, in which an output pulse parameter of each of output pulses 521 of the digital output signal 321 is within the predetermined pulse parameter range. In an embodiment, the output pulse parameter includes such as, but not limited to a high state output pulse width W3' and/or a low state output pulse width W4'.

In an embodiment, the digital output signal 321 is the inverse of the digital handshake signal 311. As a result, the phase of the digital output signal 321 is the same as the phase of the analog handshake signal 301.

In an embodiment, when the waveform generation circuit 320 determines that the number of the matching times does not reach the number of the predetermined times, the media access control circuit 330 determines that the analog handshake signal 301 is invalid. In an embodiment, when the analog handshake signal 301 is determined to be invalid, the first electronic device 100 and the second electronic device 102 performs handshake process again until the handshake is valid or until the connection is determined to be failed.

In an embodiment, after verifying the validity of the second electronic device communication wakeup signal COMWAKE2, both the communication initialization signal COMINIT and second electronic device communication wakeup signal COMWAKE2 are determined to be valid. The first electronic device 100 and the second electronic device 102 are further determined to be successfully connected. The second handshake stage of the first electronic device 100 and the second electronic device 102 are entered to negotiate the transmission speed.

Under such a condition, the selection signal SEL controls the multiplexer 340 to be electrically coupled to the analogy physical layer circuit 310 in the second handshake stage to output other digital signals from the analog physical layer circuit 310 to negotiate the transmission speed. In an embodiment, the multiplexer 340 may receive other digital signals from the analog physical layer circuit 310 through an inverter 350 since the output of the analog physical layer circuit 310 is the inverse of the input of the analog physical layer circuit 310.

When the analog physical layer circuit 310 generates the digital handshake signal 311, the environment and the manufacturing process may affect the signal generated therefrom such that a deviation is presented. The media access control circuit 330 may determine that the digital handshake signal 311 does not meet the requirement of the specification due to the deviation and further determines that the first electronic device 100 and the second electronic device 102 are not connected successfully. Even if the handshake is performed again such that the first electronic device 100 and the second electronic device 102 are connected successfully, the transmission speed may be lowered due to the previous failure of the connection.

As a result, the interface connection apparatus 300 can use the waveform generation circuit 320 to generate the digital output signal 321 having all the output pulses 521 within the predetermined pulse parameter range directly after a certain number of the pulses of the digital handshake signal 311 are determined to be within the predetermined pulse parameter range. The media access control circuit 330 thus determines the validity of the handshake between the first electronic device 100 and the second electronic device 102 and further determines that the first electronic device 100 and the second electronic device 102 are successfully connected. The handshake process is therefore not affected by the environment and the manufacturing process.

It is appreciated that the digital handshake signal 311 generated by inversing the analog handshake signal 301 and the digital output signal 321 generated to have the same phase with the analog handshake signal 301 are merely an example. In other embodiments, the analog handshake signal 301, the digital handshake signal 311 and the digital output signal 321 can be implemented to have the same phase.

Figure 6:
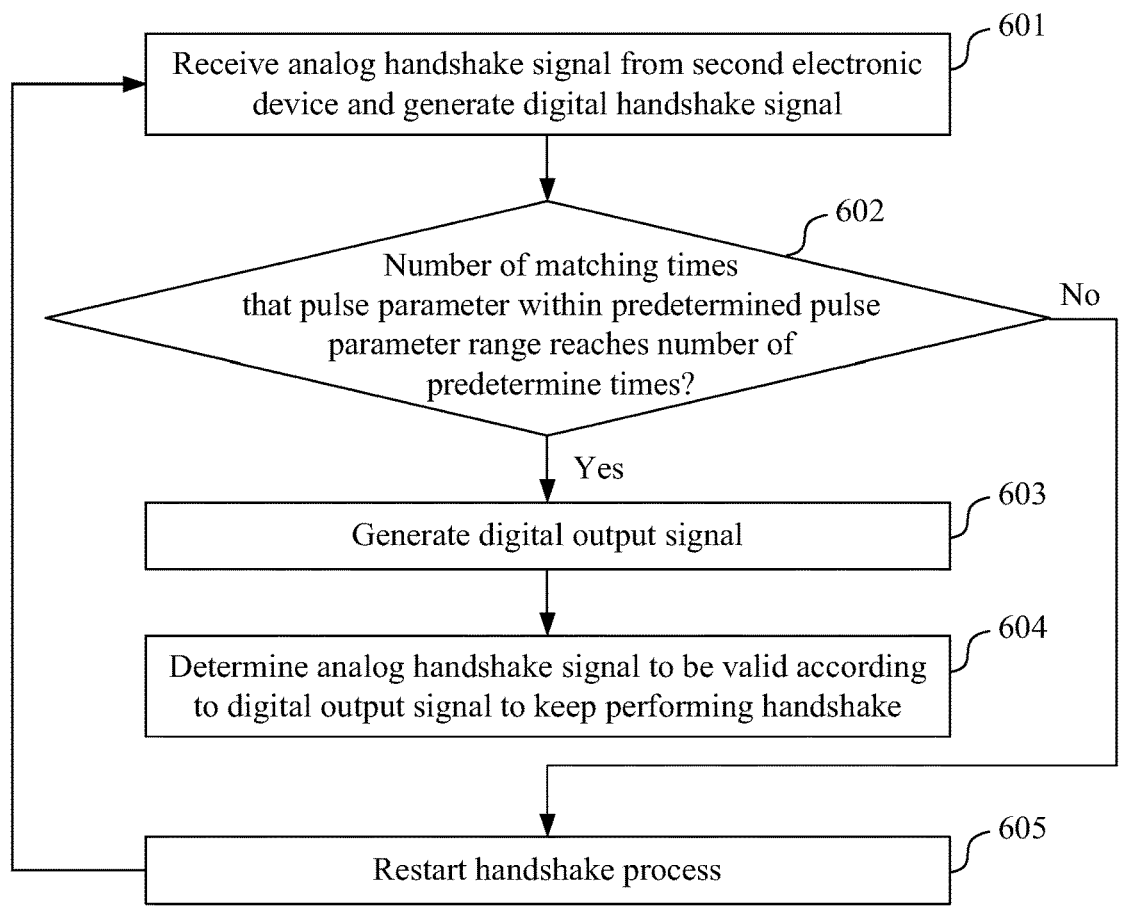
FIG. 6 is a flow chart of an interface connection method in an embodiment of the present invention.

Reference is now made to FIG. 6. FIG. 6 is a flow chart of an interface connection method 600 in an embodiment of the present invention. The interface connection method 600 can be used in the interface connection apparatus 300 illustrated in FIG. 3. The interface connection method 600 includes the steps outlined below (The operations are not recited in the sequence in which the operations are performed. That is, unless the sequence of the operations is expressly indicated, the sequence of the operations is interchangeable, and all or part of the steps may be simultaneously, partially simultaneously, or sequentially performed).

In step 601, the analog handshake signal 301 is received from the second electronic device 102 and the digital handshake signal 311 is generated by the analog physical layer circuit 310.

In step 602, whether the number of matching times that the pulse parameter of each of pulses, e.g. the pulses 411 in FIG. 4, included in the digital handshake signal 311 is within the predetermined pulse parameter range reaches the number of predetermine times is determined by the waveform generation circuit 320.

In step 603, the digital output signal 321 is generated by the waveform generation circuit 320 when the number of the matching times reaches the number of the predetermine times, in which the output pulse parameter of each of output pulses, e.g. the output pulses 421 in FIG. 4, of the digital output signal 321 is within the predetermined pulse parameter range.

In step 604, the analog handshake signal 301 is determined to be valid by the media access control circuit 330 when the media access control circuit 330 receives the digital output signal 321 to keep performing handshake.

In step 605, when the number of the matching times does not reach the number of the predetermine times, the interface connection apparatus 300 of the first electronic device 100 restarts the handshake process with the second electronic device 102 such that the flow goes back to step 601 to perform the subsequent steps of the interface connection method 600.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An interface connection apparatus disposed in a first electronic device, comprising:
   an analog physical layer circuit configured to receive an analog handshake signal from a second electronic device and generates a digital handshake signal;
   a waveform generation circuit configured to determine whether a number of matching time that a pulse parameter of each of pulses included in the digital handshake signal is within a predetermined pulse parameter range reaches a number of predetermine times, and generate a digital output signal when the number of the matching times reaches the number of the predetermine times, in which an output pulse parameter of each of output pulses of the digital output signal is within the predetermined pulse parameter range; and
   a media access control circuit configured to determine that the analog handshake signal is valid when the media access control circuit receives the digital output signal to keep performing handshake.

2. The interface connection apparatus of claim 1, wherein the waveform generation circuit determines whether the number of matching times reaches the number of predetermine times in a first handshake stage, and the interface connection apparatus further includes a multiplexer having a first terminal selectively electrically coupled to one of the waveform generation circuit and the analog physical layer circuit, and a second terminal electrically coupled to the media access control circuit;
   wherein the multiplexer is configured to be electrically coupled to the waveform generation circuit in a default setting to transmit the digital output signal to the media access control circuit when the number of the matching times reaches the number of the predetermine times, and configured to be electrically coupled to the analog physical layer circuit in a second handshake stage after the first handshake stage to output at least one of the other digital signals from the analog physical layer circuit.

3. The interface connection apparatus of claim 2, wherein the first electronic device and the second electronic device negotiate a transmission speed in the second handshake stage.

4. The interface connection apparatus of claim 1, wherein the pulse parameter comprises a high state pulse width and/or a low state pulse width, and the output pulse parameter comprises a high state output pulse width and/or a low state output pulse width.

5. The interface connection apparatus of claim 1, wherein the analog handshake signal comprises a communication initialization signal (COMINIT) and a second electronic device communication wakeup signal (COMWAKE), in which the communication initialization signal is generated according to a communication reset signal (COMRESET) transmitted from the first electronic device to the second electronic device, and the second electronic device communication wakeup signal is generated according to a first electronic device communication wakeup signal transmitted from the first electronic device to the second electronic device;
   when the media access control circuit determines that both the communication initialization signal and the second electronic device communication wakeup signal are valid, the media access control circuit further determines that the first electronic device and the second electronic device are connected successfully.

6. The interface connection apparatus of claim 1, wherein the first electronic device is a master terminal and the second electronic device is a slave terminal.

7. An interface connection method used in an interface connection apparatus disposed in a first electronic device, comprising:
   receiving an analog handshake signal from a second electronic device and generating a digital handshake signal by an analog physical layer circuit;
   determining whether a number of matching times that a pulse parameter of each of pulses included in the digital handshake signal is within a predetermined pulse parameter range reaches a number of predetermine times by a waveform generation circuit;
   generating a digital output signal by the waveform generation circuit when the number of the matching times reaches the number of the predetermine times, in which an output pulse parameter of each of output pulses of the digital output signal is within the predetermined pulse parameter range; and
   determining that the analog handshake signal is valid by a media access control circuit when the media access control circuit receives the digital output signal to keep performing handshake.

8. The interface connection method of claim 7, wherein the waveform generation circuit determines whether the number of matching times reaches the number of predetermine times in a first handshake stage, and the interface connection apparatus further includes a multiplexer having a first terminal selectively electrically coupled to one of the waveform generation circuit and the analog physical layer circuit, and a second terminal electrically coupled to the media access control circuit, the interface connection method further comprises:
   electrically coupling the multiplexer to the waveform generation circuit in a default setting to transmit the digital output signal to the media access control circuit when the number of the matching times reaches the number of the predetermine times; and
   electrically coupling the multiplexer to the analog physical layer circuit in a second handshake stage after the first handshake stage to output at least one of the other digital signals from the analog physical layer circuit.

9. The interface connection method of claim 8, further comprising:
   negotiating a transmission speed in the second handshake stage by the first electronic device and the second electronic device.

10. The interface connection method of claim 7, wherein the pulse parameter comprises a high state pulse width and/or a low state pulse width, and the output pulse parameter comprises a high state output pulse width and/or a low state output pulse width.

11. The interface connection method of claim 7, wherein the analog handshake signal comprises a communication initialization signal and a second electronic device communication wakeup signal, the interface connection method further comprises:
   transmitting a communication reset signal transmitted from the first electronic device to the second electronic device such that the second electronic device generates the communication initialization signal;
   transmitting a first electronic device communication wakeup signal transmitted from the first electronic device to the second electronic device such that the second electronic device generates the second electronic device communication wakeup signal; and
   determining that the first electronic device and the second electronic device are connected successfully by the media access control circuit when the media access control circuit determines that both the communication initialization signal and the second electronic device communication wakeup signal are valid.

12. The interface connection method of claim 7, wherein the first electronic device is a master terminal and the second electronic device is a slave terminal.

\* \* \* \* \*